United States Patent [19]

Reed

[11] Patent Number: 5,405,115
[45] Date of Patent: Apr. 11, 1995

[54] MOUNTING BRACKET ASSEMBLY

[75] Inventor: Raymond G. Reed, Milwaukie, Oreg.

[73] Assignee: A-Dec, Inc., Newberg, Oreg.

[21] Appl. No.: 307,409

[22] Filed: Sep. 16, 1994

Related U.S. Application Data

[63] Continuation of Ser. No. 12,340, Feb. 2, 1993, abandoned.

[51] Int. Cl.6 .................................................. E04G 3/00
[52] U.S. Cl. ............................ 248/291; 16/DIG. 24; 16/114 R; 248/222.1; 403/362
[58] Field of Search ................... 248/291, 288.1, 222.1; 16/114 R, 125, DIG. 24, DIG. 40, 111 R, 112, 314, DIG. 23, DIG. 41; 411/378, 424; 403/246, 362, 405.1; 294/57, 58, 59

[56] References Cited

U.S. PATENT DOCUMENTS

| | | | |
|---|---|---|---|
| D. 243,188 | 1/1977 | Meyer | D24/1 B |
| D. 328,791 | 8/1992 | Nordstrom et al. | D24/177 |
| 777,215 | 12/1904 | Meston | 16/DIG. 41 X |
| 852,759 | 5/1907 | Bergener | 248/222.1 |
| 1,093,322 | 4/1914 | Foyer | 16/111 R |
| 1,744,413 | 1/1930 | Peterson et al. | 16/114 R |
| 1,934,911 | 11/1933 | Campbell | 248/222.1 |
| 2,571,244 | 10/1951 | Hollander | 294/57 X |
| 2,770,985 | 11/1956 | Pearce . | |
| 3,017,657 | 1/1962 | Mills | 16/114 |
| 3,113,479 | 12/1963 | Swingle | 403/362 X |
| 3,152,818 | 10/1964 | Ivins | 287/20 |
| 3,653,125 | 4/1972 | Heubeck | 32/22 |
| 3,718,974 | 3/1973 | Buchtel et al. | 32/22 |
| 3,744,349 | 7/1973 | Joncker . | |
| 3,771,226 | 11/1973 | Lieb et al. | 32/22 |
| 3,918,161 | 11/1975 | Morgan et al. | 32/22 |
| 4,372,703 | 2/1983 | Szostak | 403/362 X |
| 4,404,872 | 9/1983 | Fritz | 16/DIG. 24 X |
| 4,538,847 | 9/1985 | Lopshansky | 294/57 X |
| 4,676,750 | 6/1987 | Mason | 433/101 |
| 4,883,316 | 11/1989 | Austin, Jr. et al. | 297/191 |
| 4,912,809 | 4/1990 | Scheuer | 16/114 R |
| 4,926,522 | 5/1990 | Wong | 16/114 R |
| 4,938,919 | 7/1990 | Rylatt | 403/362 X |
| 4,952,146 | 8/1990 | Doty | 433/77 |
| 5,131,116 | 7/1992 | Bowdler | 16/114 R |
| 5,176,423 | 1/1993 | Austin, Jr. et al. | 297/191 |

OTHER PUBLICATIONS

A-Dec 117-page equipment catalog, cover and pp. 36, 46, 57, Jan. 1991.
A-Dec 121-page catalog, cover and pp. 33, 38, 59-60, circa Sep. 1991.
A-Dec "J-Dec" two-page Japanese language brochure circa Jan. 1991.
Takara Belmont 36-page Japanese language brochure, cover and p. 18, circa Jan. 1991.

*Primary Examiner*—Ramon O. Ramirez
*Assistant Examiner*—Korie H. Chan
*Attorney, Agent, or Firm*—Klarquist Sparkman Campbell Leigh & Whinston

[57] ABSTRACT

A bracket for attaching a handle to a surface has a main bore for receiving the handle. A secondary bore intersects the main bore and receives a set screw having a tapered midsection which tangentially engages the handle. Tightening the set screw advances the tapered midsection which acts as a wedge to press against the handle and maintain the handle firmly within the main bore.

4 Claims, 3 Drawing Sheets

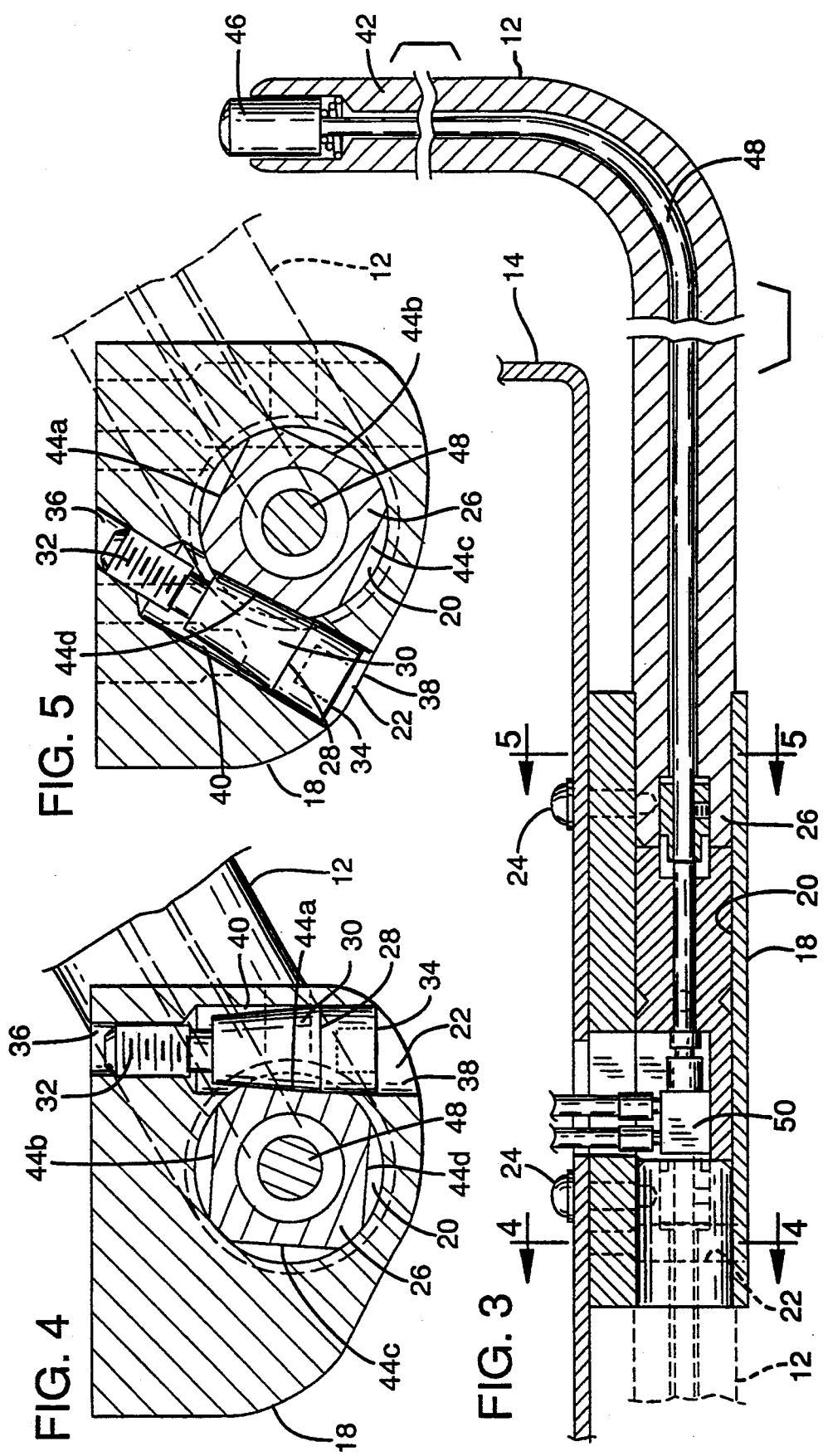

MOUNTING BRACKET ASSEMBLY

This application is a continuation of application Ser. No. 08/012,340, filed on Feb. 2, 1993, now abandoned.

BACKGROUND OF THE INVENTION

1. Field of the Invention

The present invention relates to mounting brackets, and more particularly, to a mounting bracket assembly for removably attaching a handle or the like to a surface.

2. Description of Related Art

Handles are frequently attached to various objects to allow the objects to be easily and conveniently gripped and manipulated. In many instances, it is desirable for the handle to be removable or adjustable to accommodate the particular preferences of the user. For example, left handed individuals may prefer a handle on the left side of an object while right handed individuals typically prefer a handle on the right. In either case, the handle should be firmly attached to the object so that the handle does not move, or wobble as it is pushed or pulled.

Mounting systems frequently incorporate set screws to removably attach handles and the like to various objects. Typically in such a system, a stud extends from the object and is received in a bore provided in the handle. A set screw is threaded into a hole which intersects the bore such that the end of the set screw engages the stud. Rotation of the set screw in one direction pushes the end of the set screw against the stud to hold the handle in place. Rotation of the set screw in the other direction retracts the end of the screw to release the handle.

As can be appreciated, in many set screw mounting systems, the handle is held in place primarily through friction. The end of the set screw engages the stud to create friction between the set screw and the stud. In addition, the set screw presses the stud against the interior wall of the bore to create friction between the stud and the bore. The amount of friction, and hence the strength of the force holding the handle in place depends to a large degree on the force with which the set screw presses against the stud. Inadequate pressure between the set screw and the stud may allow the handle to wobble or move undesirably.

In an effort to obtain the pressure necessary to hold the handle in place, the set screw is threaded into the hole until the end of the set screw engages the stud. Once the set screw is in contact with the stud, it is then turned an additional amount. Typically, this additional turning requires a relatively high torque and results in the elastic or, in some cases, plastic deformation of the mounting components, including the stud, the end of the set screw, or the threads. The additional turning of the set screw, after the set screw engages the stud, increases the friction between the set screw and the stud to help hold the handle in place.

In existing set screw systems, the threads of the set screw act as an inclined plane to transform rotational movement of the set screw into translational movement of the set screw. One rotation of the set screw will move the end of the set screw a distance equal to the pitch of the threads, that is, the distance between adjacent threads on the set screw. In this way, the threads of the set screw provide a mechanical advantage to help allow the set screw to be tightened.

However, in many set screw systems, the pitch of the threads on the set screw is many times larger than the amount of allowable deformation. Thus, the additional turning required to tighten the set screw is often limited to only a small fraction of a rotation. As a result, even a slight loosening of the set screw may cause the handle to loosen to the point where it wobbles, moves, or even falls off when gripped by a user. Moreover, because the additional tightening of the set screw must be accomplished with only a fraction of a turn of the set screw, a relatively high torque is required. This can make the set screw harder to install and remove, and can result in failure of the set screw head or threads.

In addition, in typical set screw mounting systems the end of the set screw contacts the stud to apply the pressure necessary to hold the handle in place. In this configuration, the force to create the pressure is usually directed axially along the set screw and is carried almost exclusively by the threads of the set screw. This can add to the difficulty of tightening the set screw adequately to hold the handle in place and can also result in damage or failure of the set screw threads.

SUMMARY OF THE INVENTION

Accordingly, it is an object of the present invention to provide a mounting bracket for securely and firmly attaching a handle or the like to a surface.

It is a further object of the invention to provide a mounting bracket that is durable, easy to install, inexpensive to manufacture, and allows for easy removal or adjustment of the handle.

A mounting bracket in accordance with one aspect of the present invention has a bracket body with a main bore for receiving a handle or the like. The main bore is intersected by a secondary bore which is threaded to receive a set screw. The set screw has a small end, a large end, and a tapered, frustoconical midportion. The secondary bore intersects the main bore such that the tapered, frustoconical midportion of the set screw tangentially engages the handle to hold the handle in position within the main bore.

In one aspect of the invention, the tapered, frustoconical midportion of the set screw acts as a wedge. As the set screw is threaded into the secondary bore, the midportion is advanced deeper into the secondary bore to firmly and securely engage the handle and wedge the handle in place within the main bore. This wedge-like action of the tapered, frustoconical midportion of the set screw acts in conjunction with the threads of the set screw to enhance the mechanical advantage available to tighten the screw and bring it into solid engagement with the handle.

In another aspect of the invention, the handle is provided with a face that corresponds with a predetermined position of the handle. The handle can then be placed within the main bore with the midportion of the set screw engaging the face to maintain the handle in the predetermined position.

Other objects and aspects of the invention will become apparent to those skilled in the art from the detailed description of the invention which is presented by way of example and not as a limitation of the present invention.

BRIEF DESCRIPTION OF THE DRAWINGS

FIG. 3 is a cross sectional view taken along line 3—3 in FIG. 2 with the handle shown in cross section.

FIG. 4 is a cross sectional view taken along line 4—4 in FIG. 3.

FIG. 5 is a cross sectional view taken along line 5—5 in FIG. 3.

DESCRIPTION OF THE ILLUSTRATED EMBODIMENT

Figure 1:
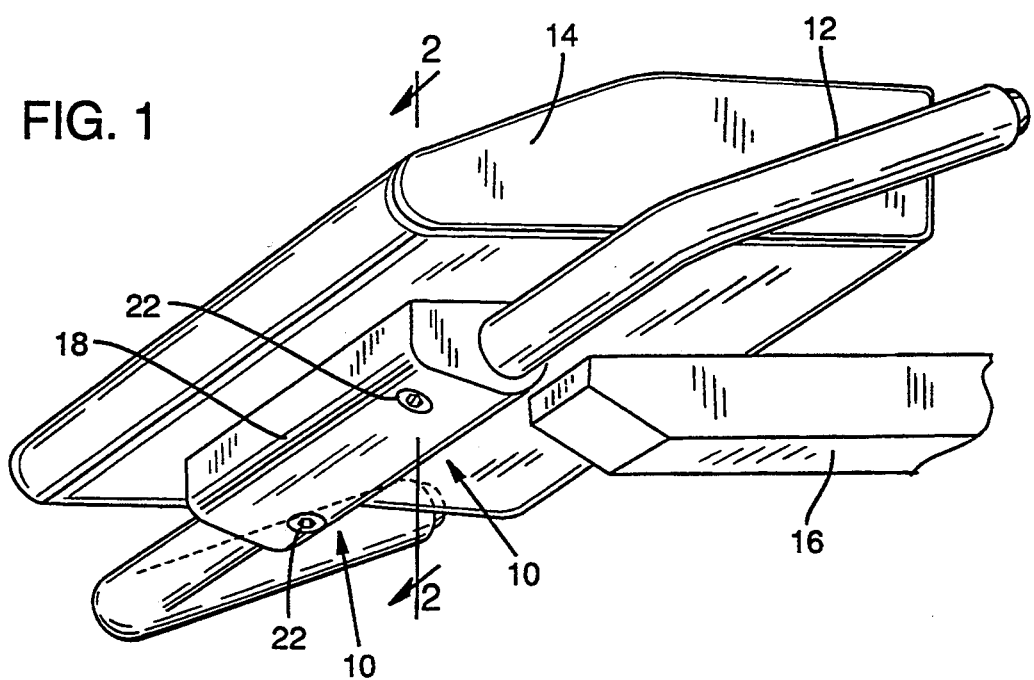
FIG. 1 is perspective view of a mounting bracket in accordance with a preferred embodiment of the present invention.

A mounting bracket in accordance with a preferred embodiment of the present invention is illustrated in FIG. 1 as reference numeral 10. In the illustrated embodiment, the mounting bracket 10 is being used to attach a handle 12 to a dental control unit 14. The dental control unit 14 is supported on an arm 16 that allows the unit to be moved freely. In this manner, the dentist or dental assistant can grasp the handle 12 to quickly and easily position the control unit 14 into any desired position.

Each dentist or dental assistant may have a particular preference as to the orientation or location of the handle 12. For example, a left handed dentist or dental assistant may prefer to have the handle on the left side of the control unit 14 while a right handed dentist or dental assistant may prefer the handle on the right. Similarly, each user may have a particular preference as to the orientation of the handle. Accordingly, the illustrated mounting bracket allows for a handle to be mounted to the right side of the control unit, the left side of the control unit (illustrated in phantom), or both. Similarly, the illustrated bracket allows each handle to be independently oriented in a number of desired positions.

In many environments, such as shared offices, dental schools, or the like, a single control unit may be used by a variety of different individuals, some of whom may be left handed, some of whom may be right handed, and each of whom may have different individual preferences as to the orientation and location of the handle. To accommodate this, the illustrated mounting bracket allows one or both handles to be quickly and easily removed or adjusted. As can be appreciated, a mounting bracket in accordance with the present invention is thus ideally suited for use in attaching handles to dental control units. However, it should be understood that different embodiments of a mounting bracket in accordance with the present invention are also ideally suited for use in a wide variety of settings and that the present invention is not limited to the embodiment described in the context of a dental control unit.

Figure 2:
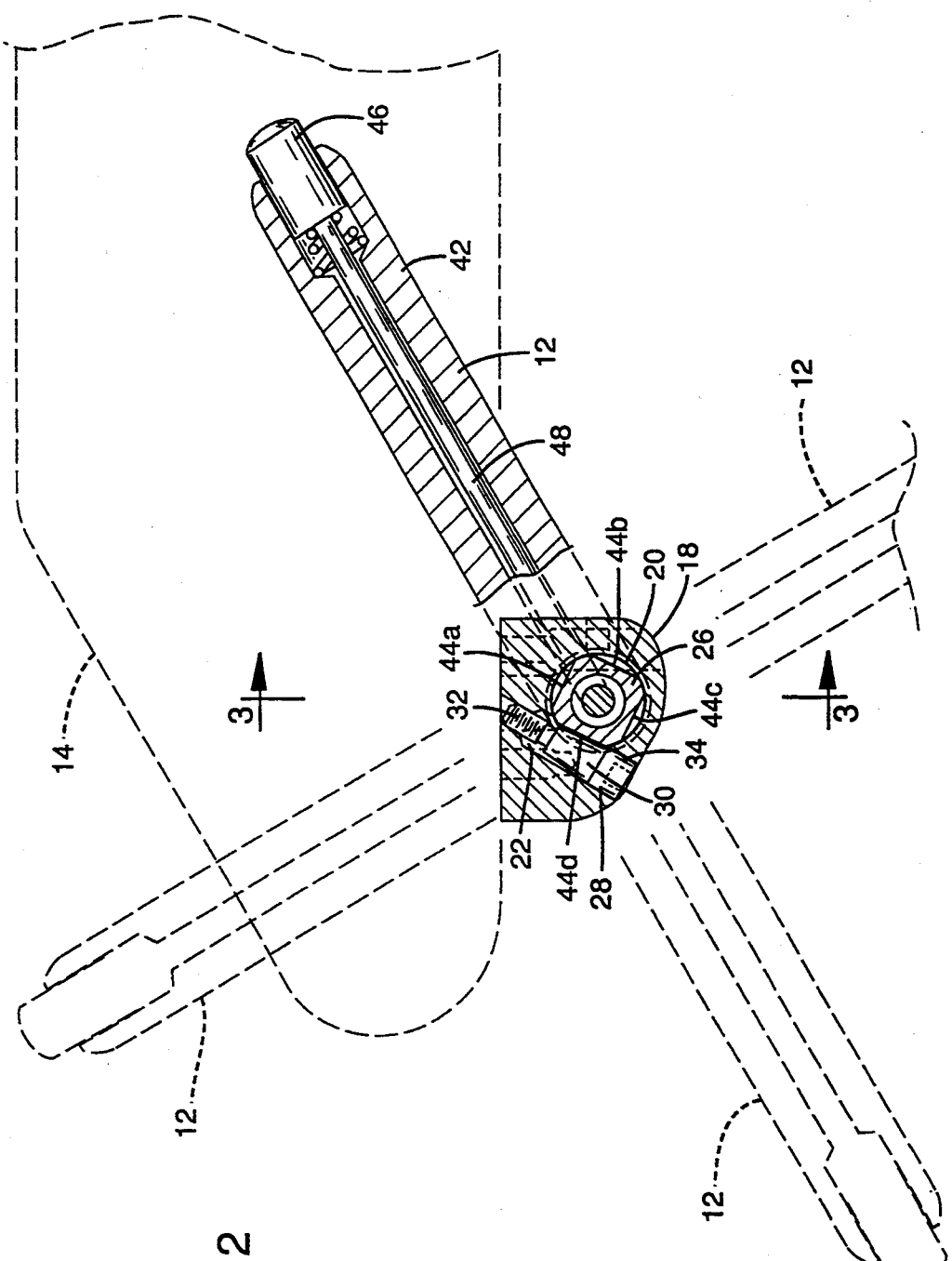
FIG. 2 is a cross sectional view taken along line 2—2 in FIG. 1.

As best seen in FIGS. 2 and 3, the mounting bracket has a bracket body 18 attached to the underside of the control unit 14. A main bore 20 extends through the bracket body 18 and receives the base 26 of a handle 12. A secondary bore 22 tangentially intersects each end of the main bore 20. The secondary bore 22 is threaded to receive a set screw 28. The set screw 28 has a tapered, frustoconical midportion 30 which engages the base 26 of the handle 12. In this manner, when the set screw 28 is threaded into the secondary bore 22, the tapered midportion 30 acts as a wedge to firmly and securely hold the handle 12 within the bore.

In the illustrated embodiment, the bracket body 18 is attached to the underside of the control unit with screws 24. The illustrated embodiment allows for a single bracket body 18 to be used to attach two handles 12 to the control unit 14. Accordingly, the main bore 20 extends completely through the bracket body 18 and each end of the main bore 20 is configured to receive the base 26 of a handle 12. In alternative embodiments, the bracket body could be provided with two separate main bores, each for receiving one handle. Alternatively, two separate bracket bodies could be used, each having a single main bore for receiving a single handle.

The main bore 20 of the illustrated embodiment is cylindrical with a circular cross section. This configuration facilitates simplicity in manufacturing the bracket body. However, the main bore may have a variety of other cross sections, such as square, octagonal, or virtually any other shape.

The handle 12 of the illustrated embodiment is generally "L" shaped. One leg of the handle is provided with a base 26 which is configured to be received within the main bore 20. The base is sized such that the handle fits snugly within the main bore to limit handle wobble, and yet is allowed to move longitudinally and rotate within the main bore 20. Although the illustrated embodiment shows a mounting bracket for attaching a handle to a surface, it should be appreciated that the mounting bracket can also be used to attach other objects. Thus, mounting members other than the base of a handle can also be used with a mounting bracket in accordance with the present invention.

The other leg of the handle 12 provides a hand grip 42 to be gripped by a user. In the illustrated embodiment, the handle is hollow and is provided with a button 46 at the end of the hand grip. The button is operatively coupled by an actuating cable 48 to a control valve 50. The control valve 50 controls a locking mechanism (not shown) for preventing movement of the arm 16. In this manner, the dentist or dental assistant can grasp the hand grip 42, actuate the button 46 with their thumb to release the locking mechanism, move the control unit to the desired position, and release the button 46 to reactivate the locking mechanism and maintain the control unit in the desired position.

Associated with each end of the main bore 20 is a secondary bore 22 which receives a set screw 28. The set screw 28, seen best in FIGS. 4 and 5, has a small threaded end 32, a large head 34, and a tapered midportion 30. Although the taper of the midportion 30 may vary depending on the particular circumstances in which the mounting bracket is to used, in the illustrated embodiment, a taper of about five degrees has been found to be satisfactory.

Each secondary bore 22 is configured to receive the set screw 28. In particular, each secondary bore has a small portion 36 which is sized and threaded to receive the small end 32 of the set screw 28. In addition, the secondary bore 22 has a large portion 38 to receive the large head 34 of the set screw 28. The secondary bore is sized to allow the set screw 28 to rotate freely within the secondary bore 22 but limit lateral deflection of the set screw 28. In the illustrated embodiment, the small end 32 of the set screw 28 is provided with threads. However, in alternative embodiments, it may be desirable to have the threads at the large end of the set screw 28.

The secondary bore 22 tangentially intersects the main bore 20. By tangential it is meant that the secondary bore 22 and the main bore 20 intersect in such a manner that the tapered midportion 30, not the end of the set screw 28, engages the base 26 of the handle 12. In this manner, the tapered midportion 30 acts as a wedge to apply pressure to the base 26. That is, as the set screw 28 is threaded into the secondary bore 22, the tapered midportion 30 is advanced, like a wedge, to increase the pressure applied to the base 26. This combination of a threaded set screw and the wedge-like action of the tapered midportion greatly increases the mechanical advantage available to apply pressure to the base.

For example, in a standard set screw where the end of the set screw engages a stud, one rotation of the screw advances the end of the set screw toward the stud a distance equal to the pitch of the threads. However, in the illustrated set screw with its wedge-like, tangential engagement, one rotation of the set screw advances the engaging portion toward the base a distance equal to the sin of the taper angle times the pitch of the threads. Thus, with a given force applied to the head of a set screw, the illustrated set screw will produce a greater force against the base than a standard set screw. This results in a stronger, more secure attachment of the handle.

Moreover, in the illustrated mounting bracket, the force applied by the set screw to the base is generally perpendicular to the axis of the set screw. This allows the force to be carried by the ends of the set screw and the bracket body rather than by the threads.

In the illustrated embodiment, a firm seating of the base 26 within the main bore 20 is further ensured by the position of the secondary bore 22. In particular, the secondary bore 22 is positioned to intersect the main bore 20 such that tightening of the set screw 28 tends to pull the base 26 into the main bore 20. As illustrated in FIG. 4, for the right hand handle the secondary bore intersects the main bore on the front side of the bracket body. However, as illustrated in FIG. 5, for a left hand handle the secondary bore intersects the main bore on the back side of the bracket body. In both cases, the position of the secondary bore is such that friction between the rotating set screw and the base tends to urge the base into the main bore.

In the illustrated embodiment, the base 26 is provided with four faces 44a-d. Each face corresponds with a predetermined position of the handle. In this manner, a particular face can be brought into engagement with the tapered portion of the set screw to maintain the handle in the predetermined position. Further, the tapered midportion engages the flat face along a line rather than a point. This also increases the strength and stability of the handle attachment and greatly reduces the tendency of the handle to rotate within the main bore.

In the illustrated embodiment, there are four faces arranged at angles of about ninety degrees from each other to correspond with the handle positions illustrated in phantom in FIG. 2. However, in other embodiments there could be any number of faces, or no faces, and the faces could be arranged at any angles which correspond to desired positions of the handle. To orient the handle in a desired position, the set screw is loosened, the handle is moved to the desired orientation, and the set screw is retightened to hold the handle firmly in place. Similarly, to remove the handle, the set screw is loosened and the handle is removed. In this manner, a user can quickly and easily adjust the handles of the dental control panel to conform with their personal preferences.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

I claim:

1. A mounting bracket assembly comprising:
   a handle having a base;
   a bracket body defining a bore so that the base of the handle may be inserted into one end of the bore at one side of the body, the base of the handle also being insertable into a second end of the bore located at another side of the body;
   a first set screw member threaded in the body near the one end of the bore and protruding into the bore to tangentially contact the base of the handle when the base is inserted into the one end;
   a second set screw member threaded in the body near the second end of the bore and protruding into the bore to tangentially contact the base of the handle when the base is inserted into the second end; and
   wherein the first and second set screw members are arranged so that when advanced into the body and contacting the handle base, friction force between the base and the associated set screw urges the handle base into the bore, irrespective of which end of the bore the handle base is inserted.

2. The assembly of claim 1 wherein the first and second set screw members each have a frustoconical midportion that contacts the base of the inserted handle.

3. The assembly of claim 2 wherein the base has at least one flat surface against which the midportion of the first and second set screw members contact.

4. The assembly of claim 1 wherein the base has at least one flat surface against which the first and second set screw members contact.

* * * * *